No. 644,352. Patented Feb. 27, 1900.
J. P. DUVALL.
FRICTION CLUTCH.
(Application filed May 10, 1899.)
(No Model.)
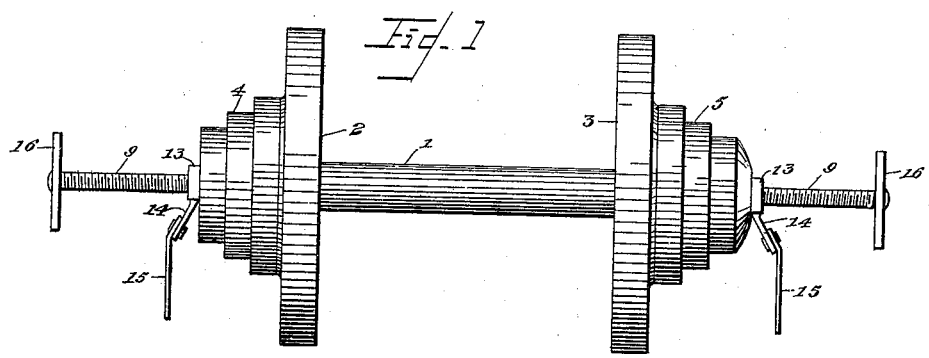
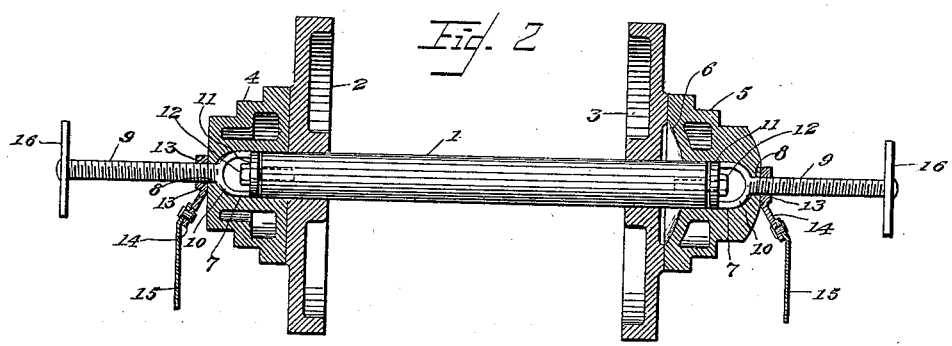
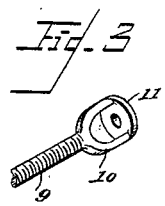
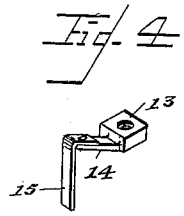
Witnesses
J. P. Duvall, Inventor
By his Attorneys.
THE NORRIS PETERS CO., PHOTO-LITHO., WASHINGTON, D. C.

UNITED STATES PATENT OFFICE.

JEPHTHAH P. DUVALL, OF WAVERLY, IOWA.

FRICTION-CLUTCH.

SPECIFICATION forming part of Letters Patent No. 644,352, dated February 27, 1900.

Application filed May 10, 1899. Serial No. 716,289. (No model.)

*To all whom it may concern:*

Be it known that I, JEPHTHAH P. DUVALL, a citizen of the United States, residing at Waverly, in the county of Bremer and State of Iowa, have invented a new and useful Friction-Clutch, of which the following is a specification.

The invention relates to improvements in friction-clutches.

The object of the present invention is to improve the construction of friction-clutches and to provide a simple and comparatively inexpensive one designed for gasolene-engines and other machinery and capable of being readily operated while such machinery is in motion to engage a pulley with and disengage it therefrom.

The invention consists in the construction and novel combination and arrangement of parts, as hereinafter fully described, illustrated in the accompanying drawings, and pointed out in the claims hereto appended.

In the drawings, Figure 1 is a side elevation of a friction-clutch constructed in accordance with this invention. Fig. 2 is a longitudinal sectional view of the same. Fig. 3 is a detail perspective view of the inner portion of the adjusting-screw. Fig. 4 is a detail perspective view of the clamping-nut.

Like numerals of reference designate corresponding parts in all the figures of the drawings.

1 designates a shaft provided near its ends with pulleys or wheels 2 and 3, which may consist of balance-wheels or which may be an ordinary fast pulley, and on the ends of the shaft are arranged loose pulleys 4 and 5, although a single continuous or solid pulley is illustrated in the accompanying drawings on each end of the shaft. The pulley 4 has a flat inner face for engaging the adjacent fast wheel or pulley 2, and the other loose pulley 5 has a concave inner face 6 and is adapted to frictionally engage the fast wheel or pulley 3 at its periphery, and the area of the engaging face may be varied according to the character of work to be performed. Each of the pulleys 4 and 5 is provided with a bore or opening 7, into which extends the adjacent end of the shaft 1, and the outer portion 8 of the bore or opening is reduced for the reception of an operating or adjusting screw 9, which is swiveled at its inner end to the shaft 1. The screw 9 is provided at its inner end with a yoke 10, having a disk 11, and this disk or head is centrally perforated for the reception of a fastening device 12 for securing the screw to the shaft 1, the head of the fastening device 12 being located within the yoke 10 and being separated a sufficient distance from the end of the shaft to provide the necessary play for engaging the loose pulley with and disengaging it from the fast wheel or pulley without binding against the end of the shaft.

Arranged on the screw is a clamping-nut 13, adapted to engage the outer face of the loose pulley and provided with an arm 14, having preferably attached to it a strap 15, adapted to be readily grasped by the operator when the parts are in motion without liability of the hand of the operator coming in contact with the adjacent moving parts. The shaft may form any portion of a piece of machinery, and the screw 9 is provided at its outer end with a grip or handle 16 and is threaded in the direction opposite that of the rotation of the shaft, the screw at the right-hand side of Fig. 2 having left-hand screw-threads and that at the left-hand side being provided with right-hand screw-threads, and when it is desired to engage the loose pulley with the fast wheel or pulley the said screw is rotated in the direction in which the shaft rotates until such engagement is effected and the frictional engagement will be in proportion to the strain on the loose pulley, or, in other words, to the work to be performed. While the screw is being rotated to move the loose pulley inwardly the nut is held stationary by the operator until such engagement is effected; but when it is desired to disengage the loose pulley the operator simply grasps the screw, and the forward rotation of the fast pulley or wheel will disengage the parts.

The invention has the following advantages: The clutch, which is simple and comparatively inexpensive in construction, possesses great strength and durability, and it is easily operated to carry the loose pulley into and out of engagement with the fast pulley. The disengagement is effected by simply grasping the handle or grip at the outer end of the screw, and the forward rotation of the shaft will unscrew the parts and free the loose pulley. The strap, which is attached to the arm of the clamping-nut, forms a convenient grip for enabling the operator to hold the nut stationary while the screw is being rotated.

Changes in the form, proportion, size, and the minor details of construction within the scope of the appended claims may be resorted to without departing from the spirit or sacrificing any of the advantages of this invention, such as constructing the parts of any suitable material and providing wear-plates or other engaging faces when wooden pulleys are employed.

What is claimed is—

1. A friction-clutch comprising a fast wheel or pulley, a loose pulley adapted to frictionally engage the fast wheel or pulley, a clamping-nut arranged to engage the outer face of the loose pulley, and a screw receiving the nut and extending longitudinally of and having a swiveled connection with the hub of the fast wheel or pulley, said screw being provided with threads arranged to advance the nut toward the loose wheel or pulley when the said nut is turned in a direction opposite to that of the rotation of the fast wheel or pulley, substantially as described.

2. A friction-clutch comprising a shaft, a fast wheel or pulley mounted thereon, a loose wheel or pulley, a clamping-nut arranged to engage the outer face of the loose wheel or pulley, and a screw threaded in the nut and extending longitudinally of and having a swivel connection with the shaft, and provided with screw-threads arranged to advance the nut toward the loose wheel or pulley when the said nut is turned in the direction opposite that of the rotation of the shaft, whereby the movement of the fast wheel or pulley will release the clutch when the screw is held stationary, substantially as described.

3. A friction-clutch comprising a shaft, a fast wheel or pulley mounted thereon, a loose wheel or pulley, a screw extending longitudinally of the shaft and having a swivel connection therewith and provided at its outer end with a grip, and a clamping-nut provided with an arm having a strap attached to it, said nut being arranged on the screw, the latter being provided with threads arranged to advance the nut toward the loose wheel or pulley when the said nut is turned in a direction opposite to that of the rotation of the shaft, substantially as described.

In testimony that I claim the foregoing as my own I have hereto affixed my signature in the presence of two witnesses.

JEPHTHAH P. DUVALL.

Witnesses:
F. H. MUNGER,
WILL POCKELS.